(12) United States Patent
Nuss

(10) Patent No.: US 10,457,395 B2
(45) Date of Patent: Oct. 29, 2019

(54) FASTENING SYSTEM FOR FASTENING AN OBJECT IN A VEHICLE

(71) Applicant: B/E Aerospace Systems GmbH, Lübeck (DE)

(72) Inventor: Frank Nuss, Helmstadt-Bargen (DE)

(73) Assignee: B/E Aerospace Systems GmbH, Lubeck (DE)

( * ) Notice: Subject to any disclaimer, the term of this patent is extended or adjusted under 35 U.S.C. 154(b) by 0 days.

(21) Appl. No.: 15/612,770

(22) Filed: Jun. 2, 2017

(65) Prior Publication Data

US 2017/0267351 A1    Sep. 21, 2017

Related U.S. Application Data

(63) Continuation of application No. PCT/DE2015/200525, filed on Dec. 3, 2015.

(30) Foreign Application Priority Data

Dec. 5, 2014 (DE) ........................ 10 2014 225 015

(51) Int. Cl.
| A47B 97/00 | (2006.01) |
| B64D 11/00 | (2006.01) |
| F16B 2/10 | (2006.01) |
| F16M 13/02 | (2006.01) |

(52) U.S. Cl.
CPC ........... *B64D 11/00* (2013.01); *B64D 11/003* (2013.01); *F16B 2/10* (2013.01); *F16M 13/022* (2013.01); *B64D 11/0015* (2013.01); *B64D 2011/0046* (2013.01); *B64D 2011/0053* (2013.01); *B64D 2231/02* (2013.01)

(58) Field of Classification Search
CPC ............................ B64D 11/00; B64D 11/0015

USPC .......................................... 248/221.11, 503.1
See application file for complete search history.

(56) References Cited

U.S. PATENT DOCUMENTS

| 4,575,295 A * | 3/1986 | Rebentisch | ........... F16B 37/046 |
| | | | 411/427 |
| 7,401,995 B2 * | 7/2008 | Senakiewich, II | .... B60P 7/0815 |
| | | | 403/374.4 |
| 2004/0113435 A1 * | 6/2004 | Marzolf | ............... E05B 85/247 |
| | | | 292/201 |

FOREIGN PATENT DOCUMENTS

| DE | 139801 A1 * | 1/1980 |
| DE | 139805 A1 | 1/1980 |
| DE | 10 2004 007 390 A1 | 9/2004 |
| DE | 10 2006 020 891 A1 | 11/2007 |
| DE | 10 2009 028 533 A1 | 2/2011 |

(Continued)

OTHER PUBLICATIONS

Office Action on German Patent Application No. 102014225015.3 dated Dec. 20, 2017. 6 pages.

(Continued)

*Primary Examiner* — Todd M Epps
(74) *Attorney, Agent, or Firm* — Donna P. Suchy

(57) ABSTRACT

A fastening system for fastening an object in a vehicle, in particular in an aircraft comprises at least one rail which is arranged on the vehicle side, and an object which is to be releasably fastened on the rail. The object can be positively fixed on the rail by way of at least one fastening device which is arranged on the object side. Spring means are provided on the fastening device, and these produce a non-positive fit between the fastening device and the rail, given a positive arrangement of the fastening device on the rail.

14 Claims, 7 Drawing Sheets

(56) References Cited

FOREIGN PATENT DOCUMENTS

| | | |
|---|---|---|
| DE | 10 2009 028 534 A1 | 2/2011 |
| DE | 10 2012 017 945 A1 | 5/2014 |
| DE | 10 2012 021 475 B4 | 10/2014 |
| EP | 1 897 803 A1 | 3/2008 |
| GB | 2 219 493 A | 12/1989 |
| WO | WO-2016/086934 A1 | 6/2016 |

OTHER PUBLICATIONS

Chinese Office Action on Chinese Application No. 2015800662090 dated Dec. 4, 2018. 9 pages.

\* cited by examiner

FASTENING SYSTEM FOR FASTENING AN OBJECT IN A VEHICLE

CROSS-REFERENCE TO RELATED APPLICATIONS

The present application is a Continuation of International Application No. PCT/DE2015/200525, filed on Dec. 3, 2015, which claims the benefit of German Patent Application No. 10 2014 225 015.3, filed on Dec. 5, 2014, the entire disclosures of all of which are incorporated herein by reference.

BACKGROUND

The invention relates to a fastening system for fastening an object in a vehicle and in particular in an aircraft, and to a fastening device for this fastening system.

During the operation of a vehicle, the objects fastened therein and the fastening means which serve for the fastening of these objects are often subjected to various shocks. This in particular applies to objects which are fastened in an aircraft, such as for example to consoles and passenger service units which are assembled in a passenger cabin above the passenger seats, and to their fastening means, which when flying through turbulence or with extreme flight manoeuvres, apart from being subjected to the weight force acting in the vertical direction, are subjected to forces acting in the vertical and horizontal direction. This loading in the most unfavourable case can lead to damage to the fastening means and the fastened object, as well as to the formation of noise.

SUMMARY

Against this background, it is the object of the present invention, to provide a fastening system, with which objects can be securely fastened in a vehicle with a simple assembly. A further object of the invention is also to provide a fastening device for this fastening system.

Advantageous further developments of the fastening system and the fastening device are to be deduced from the dependent claims, the subsequent description as well as the drawings. Hereby, the features specified in the dependent claims, advantageously in the specified combination, but also per se or in any other combination, inasmuch as is technically meaningful, can contribute to the development of the invention.

The fastening system according to the invention, for fastening an object in a vehicle, is particularly envisaged for use in an aircraft, but can also be applied for fastening an object in a land vehicle or water vehicle. The type of the object to be fastened in the vehicle is basically infinite, wherein the advantages of the fastening systems however are particularly pronounced with objects which are to be fastened in a hanging manner.

The fastening system comprises at least one rail which is arranged regarding the vehicle which is to say on the vehicle side and on which the object is to be releasably fastened. At least one fastening device is arranged on sides of the object for this purpose, and is likewise part of the invention and with which the object can be positively fixed on the rail. The fastening device is accordingly designed in a manner such that with at least one part it engages into the rail or engages around a region of the rail, in a manner such that an object fixed on the rail in this manner cannot detach from the rail on its own accord. However, certain relative movements between the object and the rail which can occur for example due to a certain play between the rail and the component or components of the fastening device which engage on the rail and/or as a result of a dynamic loading of the vehicle, are not to be completely ruled out. Spring means which, with a positive arrangement of the fastening device on the rail produce a non-positive fit between the fastening device and the rail are provided on the fastening device of the fastening system according to the invention, in order to prevent such relative movements between the object and the rail, or a release of the positive fit between the object and the rail which this entails and to provide an additional holding force for holding the object on the rail. Generally, all components and devices which elastically yield in the case of a force loading, but return into their initial condition at the end of the loading due to their elasticity can generally be used here as spring means. The spring means are arranged in the fastening device typically under bias, in a manner such that on the one hand they counteract a release of the positive fit between the fastening device and the rail and on the other hand additionally provide a non-positive connection of the fastening device connected to the object, to the rail, and this connection preferably prevents any relative movement between the object and the rail.

Basically, the part or the parts of the fastening device which serve for creating a positive fit between the object and the rail can be used for forming the non-positive fit between the object and the rail. However, it is preferable if at least one part of the fastening device which is separate from this forms the non-positive fit between the object and the rail. Accordingly, the positive and non-positive fit between the object and the rail on the fastening device are preferably produced in a manner distanced to one another. In this context, in an advantageous further development of the fastening system according to the invention, one envisages its fastening device comprising at least one receiver for the rail, wherein the rail and the receiver are designed for forming a non-positive connection to one another. The recess for this usefully has a cross-sectional profile which corresponds at least to a part of the cross-sectional profile of the rail, wherein the recess and the rail comprise at least one contact surface with one another, which is aligned obliquely to the connection direction of the object and rail, on which contact surface the receiver and the rail are in frictional contact.

In this context, it is particularly advantageous if the rail in an end section facing the object comprises a widening with a cross section which tapers in a wedge-like manner in the direction of the object, wherein the at least one receiver is provided with a cross-sectional counter which corresponds to this. Accordingly, the rail in the region of the widening, and the receiver each preferably have an essentially triangular cross-sectional profile. A section which is away from the object to be fastened is hereby preferably formed by a strip which is narrower with respect to the widening and on which the widening is arranged such that it projects on both longitudinal sides of the strip-like section of the rail, in a direction normally to the longitudinal extension of the rail, and in its manner forms undercuts on the rail which can be gripped around in a positive manner by the fastening device, i.e. by its positive fit means.

According to a further advantageous design of the fastening system according to the invention, two receivers for the rail which are distanced to one another are formed on the fastening device, which is particularly advantageous with objects with dimensions which are large in the longitudinal direction of the rail, since then the receivers which are distanced to one another and are on non-positive contact with the rail ensure a particularly stable arrangement of the fastening device with the object connected thereto, on the rail, given comparatively small contact surfaces.

The positive-fit fastening of the object on the rail is usefully effected in the intermediate space between the receivers, in the case of two receivers distanced to one another. For this, preferably at least one locking element connected to the object via the spring means is arranged in the intermediate space between the receivers, given a fastening device equipped with two receivers. With the creation of a positive connection of the object to the rail via the at least one locking element, the spring means which are fixedly connected to the object as well as fixedly connected to the locking element are biased, so that they always pull the object in the direction of the rail and create and maintain the non-positive fit between the two receivers and the rail engaging therein, even if a force acting externally on the fastening system, for example due to shaking, has the tendency to detach the connection of the rail and fastening device.

Preferably, two locking elements are arranged in the intermediate space between the receivers. In this context, it is particularly simple with regard to design, to provide two locking hooks as locking elements on the fastening device, wherein these locking hooks are articulated on a pivot and, engage around an end region of the rail which faces the object, preferably around the widening of the rail which is formed there, at two sides which are away from one another. Hereby, the creation of the positive fit between the fastening device and the rail is preferably effected by way of pivoting the locking hooks about a pivot axis formed by the pivot.

With this design, the pivot, on which the locking hooks are articulated, preferably form the spring means which produce the non-positive fit between the fastening device and the rail. For this, the pivot is usefully designed in an elastically resilient or yielding manner transversely to its longitudinal, so that it quasi forms a bending spring which is impinged by force transversely to its longitudinal extension.

In one advantageous further development, the locking hooks which are provided for the creation of the positive fit between the fastening device and the rail are formed in each case as a two-sided lever. Thus the locking hooks each comprise a force arm, on which the force necessary for pivoting the locking hooks is introduced, and a load arm, on which the positive fit means necessary for the creation of the positive fit are arranged. Hereby, a longitudinal hole is formed in each case on the two locking hooks, for receiving the pivot. A pivot movement of the two locking hooks in their position forming the positive fit between the fastening device and the rail, due to the elongate hole which is formed on the two locking hooks and through which the pivot is led, additionally causes a pull movement of the two locking hooks and thus, entailed by this, a pull force on the pivot, said pull force acting in the direction of the rail, by which means this pivot is biased.

With the preferred design of the two locking hooks articulated on the pivot as a two-sided lever, the sections of the locking hooks which form the force arms are pivoted apart, thus are spread, for forming the positive fit between the fastening device and the rail. For this, means for spreading the force arms are usefully arranged between the force arms of the locking hooks. Hereby, all devices which can be arranged in an intermediate space between the force arms of the locking hooks and exert a force on both force arms which moves the force arms of the locking hooks away from one another can be considered as means for spreading. Thus the means for spreading the force arms for example can be formed by an eccentric, a suitable toggle lever mechanism, a simple wedge or a differently shaped control body.

As has already been mentioned, the fastening system according to the invention is suitable in a particular manner for use in an aircraft. With regard to the aircraft, it is preferably the case of a passenger aircraft. In this case, the object to be fastened is a passenger service unit which can be fastened in a passenger aircraft on two rails which are arranged in a supply channel above the passenger seats. The term "passenger service unit" hereby, apart from including those devices, in which for example reading lights, loudspeakers, entertainment units, means for fresh air feed and above all emergency oxygen supply devices for passengers are arranged individually or in any combination with one another, also includes simple consoles and trim parts which are normally arranged in the region of the supply channel located above the passenger seats. Such passenger service units usually comprise a base plate covering the supply channel, on which base plate at least two, preferably however more than two fastening devices of the previously described type are arranged on a side facing the supply channel, wherein in each case at least one fastening device creates a positive and non-positive connection of the passenger service unit to one of the two rails.

BRIEF DESCRIPTION OF THE DRAWINGS

The invention is hereinafter explained in more detail by way of embodiment examples shown in the drawing. Shown in the drawings in each case in a schematically simplified manner and in different scales are.

DETAILED DESCRIPTION

Figure 1:
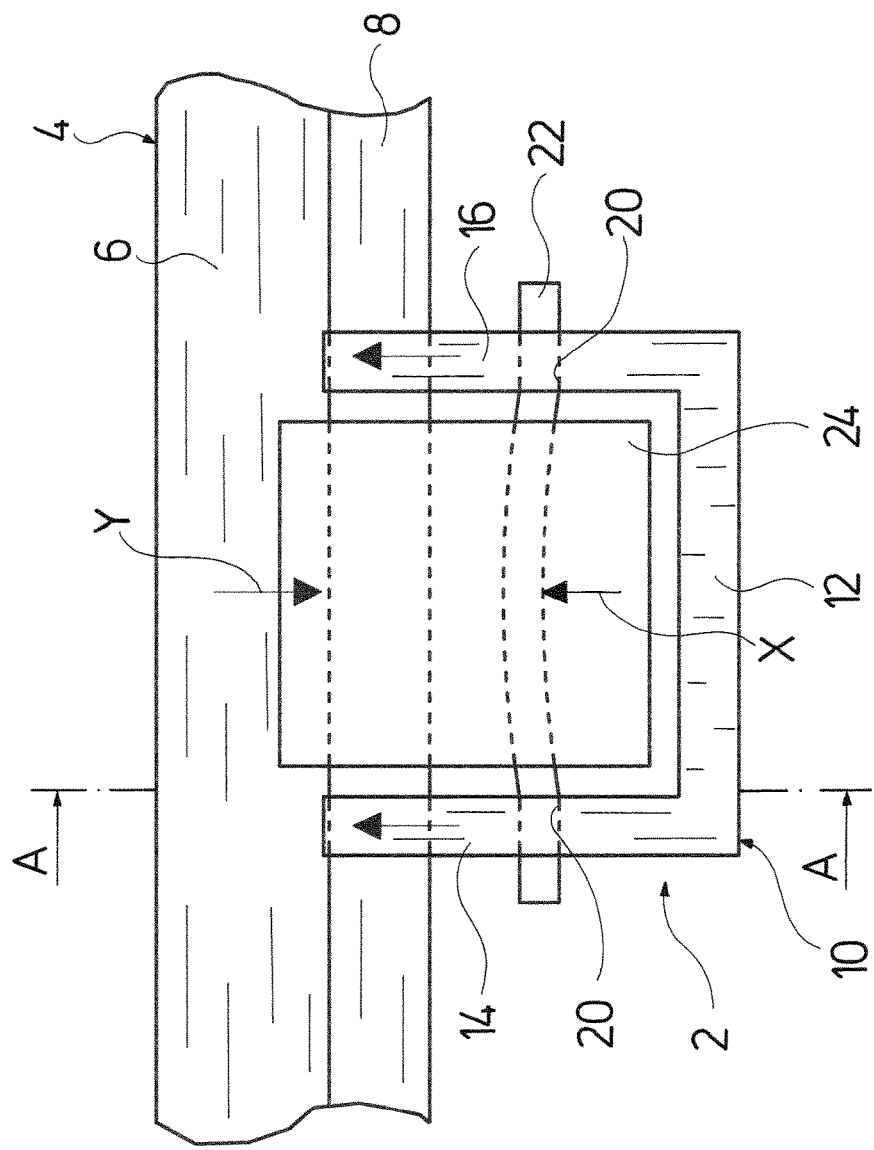
FIG. 1 in a lateral view, a fastening device of a fastening system for fastening an object on a rail, FIG. 2 a sectioned view along the section line A-A in FIG. 1, with the fastening device in the fastening condition, FIG. 3 the sectioned view according to FIG. 2, wherein the fastening device is not in the fastening condition, FIG. 4 in a perspective view, a fastening system with a module of a passenger service unit which is fastened in an aircraft on rails.
Figure 2:
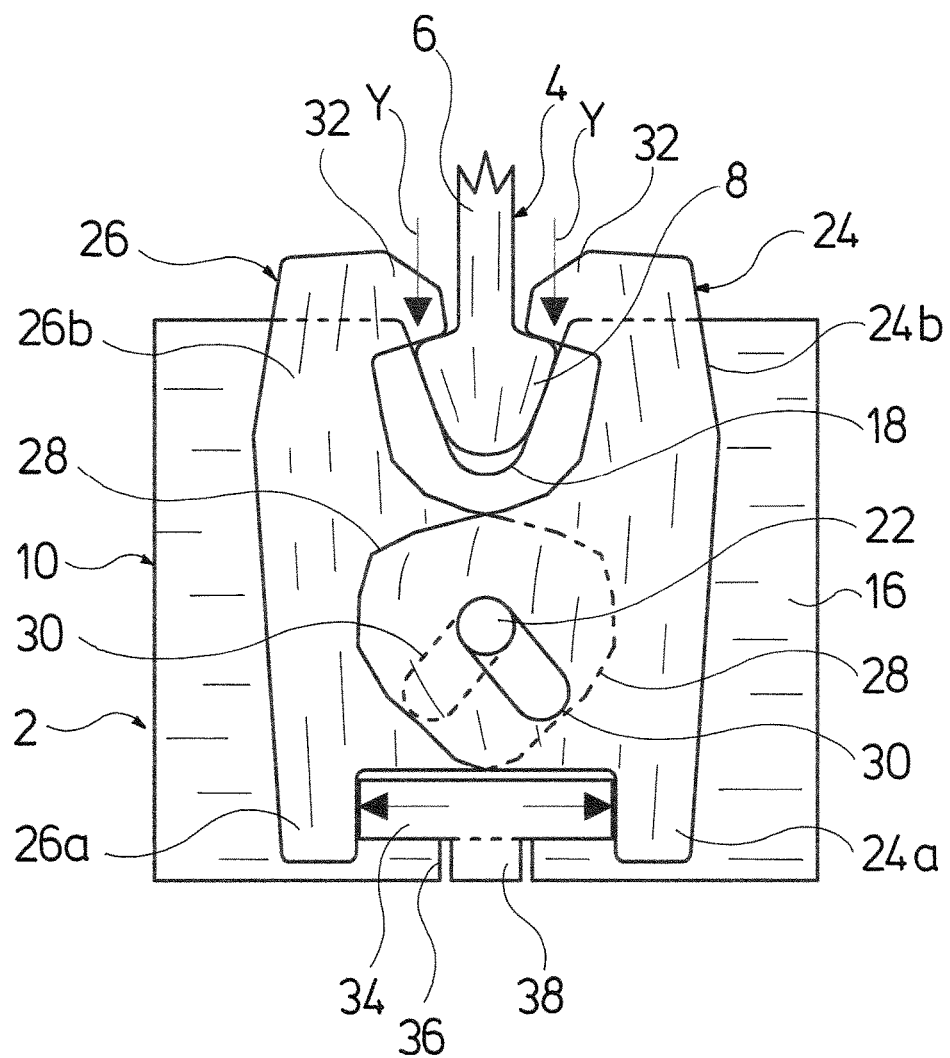
Figure 3:
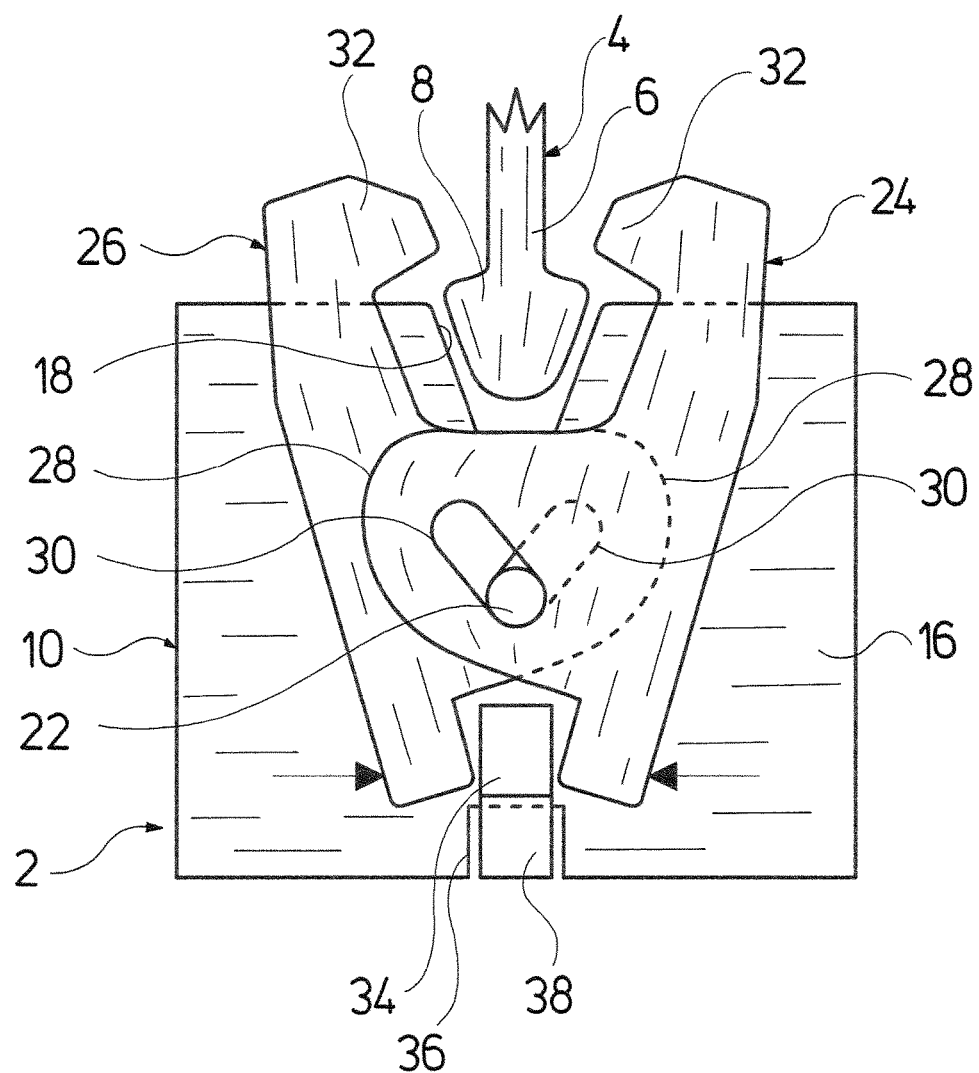

FIGS. 1 to 3 show a fastening device 2 for fastening an object on a rail 4 which is arranged on a ceiling of an aircraft which is not evident from FIGS. 1 to 3, wherein this object has been omitted in FIGS. 1 to 3 for the purpose of a better overview.

The rail 4, away from the fastening device 2, comprises a strip-like section 6, onto which a widening 8 connects in the direction of the fastening device 2. As is evident from FIGS. 2 and 3, the widening 8 has an essentially triangular contour, wherein the widening 8 tapers in a wedge-like manner in the direction of the fastening device 2.

The fastening device 2 is provided with a base body 10. This base body 10 in a lateral view has a U-shaped cross-sectional profile, wherein in each case an section 14 and 16 runs normally to the section 12 in the direction of the rail 4, at the two ends of a section 12 of the base body 10 which is aligned parallel to the rail 4 in the fastened condition of the fastening device 2 on the rail 4.

A recess which in the fastened condition of the fastening device 2 on the rail 4 forms a receiver 18 for the widening 8 formed on the rail 4 is formed in each case on the sections 14 and 16 of the base body 10. The receivers 18 which are formed on the sections 14 and 16 of the base body 10 have a triangular cross-sectional contour, corresponding to the widening 8 which is formed on the rail 4.

The sections 14 and 16 of the base body 10 of the fastening device 2 moreover in each case have a through-hole 20 which is aligned parallel to the section 12 of the base body 10. A pivot 22 is led through the through-holes 20 aligned to one another, on the sections 14 and 16 of the base body 10. The pivot 22 is formed from a spring material, for example of spring steel. Two locking hooks 24 and 26 are pivotably articulated on the pivot 22 in a manner such that they can be pivoted towards one another and away from one another.

The articulation of the locking hooks 24 and 26 on the pivot 22 is effected on a projection 28 which is formed on the two locking hooks 24 and 26 and which is aligned transversely to the main longitudinal extension of the locking hook 24 and 26 respectively, wherein the projection 28 which is formed on the locking hook 24 points in the direction of the locking hook 26 and the projection 28 formed on the locking hook 26 projects in the direction of the locking hook 24. A longitudinal hole 30 is formed in each case on the projections 28 of the two locking hooks 24 and 26, for receiving the pivot 22.

The two locking hooks 24 and 26 are in each case designed as a two-sided lever, wherein a section of the locking hook 24 which is away from the rail 4 with regard to the projection 28 in the fastening condition of the fastening device 2 forms a force arm 24a, and a section of the locking hook 24 which faces the rail forms a load arm 24b. In a manner corresponding to this, a section of the locking hook 26 which in the fastening condition of the fastening device 2 is away from the rail 4 with respect to the projection 28 forms a force arm 26a and a section of the locking hook 26 which faces the rail 4 forms a load arm 26b. A projection 32 is formed in each case at the two ends of the load arms 24b and 26b of the locking hooks 24 and 26, wherein the two projections 32 face one another. The locking hooks 24 and 26 with their projection 32 in each case grip around or encompass the widening 8 formed on the rail 4, in the fastening condition of the fastening device 2 on the rail 4, by which means the fastening device 2 and the object which is connected thereto are positively fixed on the rail 4.

The movement control of the locking hooks 24 and 26 is effected via a control body 34. This control body 34 is rotatably mounted in an intermediate space between the force arms 24a and 26a of the locking hooks 24 and 26. The control body 34 can be actuated from outside the fastening device 2. For this, an opening 36, through which a shaft 38 connected to the control body 34 is led, is formed on the section 12 of the base body 10.

The control body 34, given a rounded outer contour has a significantly greater length compared to its width and can be rotated from a first position, in which its longitudinal extension runs normally to the connection direction of the two force arms 24a and 26a (FIG. 3), into a second position, in which its longitudinal extension corresponds to the connection direction of the two force arms 24a and 26a (FIG. 2). The force arms 24a and 26a of the locking hooks 24 and 26 are spread away from one another by way of the control body 34 being rotated from the first into the second position, and the load arms 24b and 26b of the locking hooks 24 and 26 are pivoted towards one another into their position positively fixing the fastening device. Hereby, apart from the pivot movement of the locking hooks 24 and 26, a pull movement of the locking hooks 24 and 26, by way of which a clamping force X is exerted onto the pivot 22 and an additional holding force Y is exerted onto the widening 8 of the rail 4 occurs due to the elongate holes 30 which are formed on the projections 28 of the two locking hooks 24 and 26. Moreover, the sections 14 and 16 of the base body 10 of the fastening device 2 are pressed with a force Z against the rails 4, by which means a non-positive fit between the fastening device 2 with the object connected thereto and the rail 4 is produced in the contact region of the widening 8 of the rail 4 and of the receivers 18 which are formed on the sections 14 and 16 of the base body 10.

Figure 4:
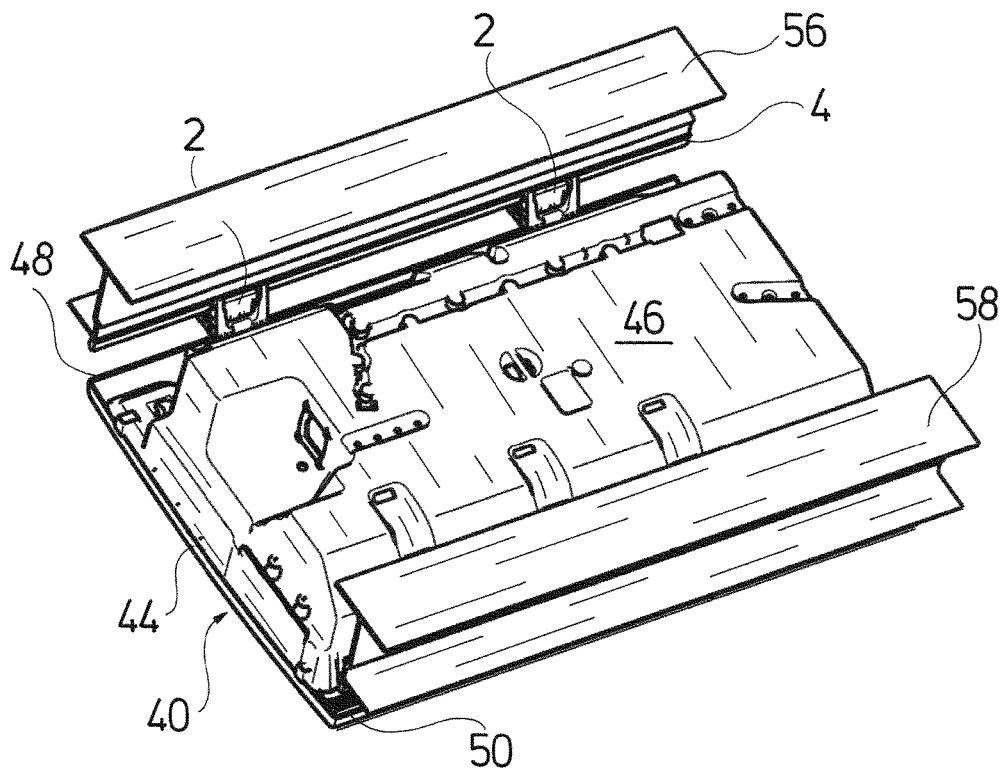
Figure 5:
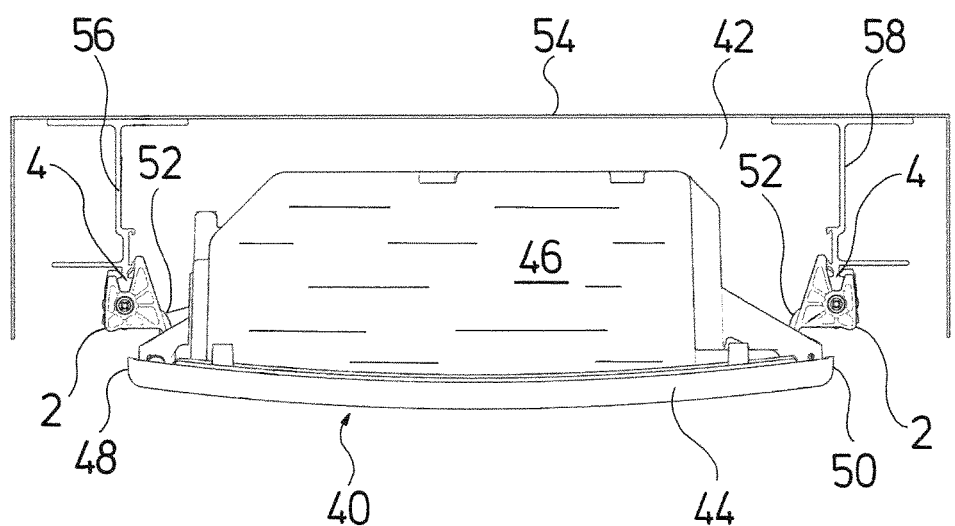
FIG. 5 the fastening system according to FIG. 4, in a lateral view.
Figure 8:
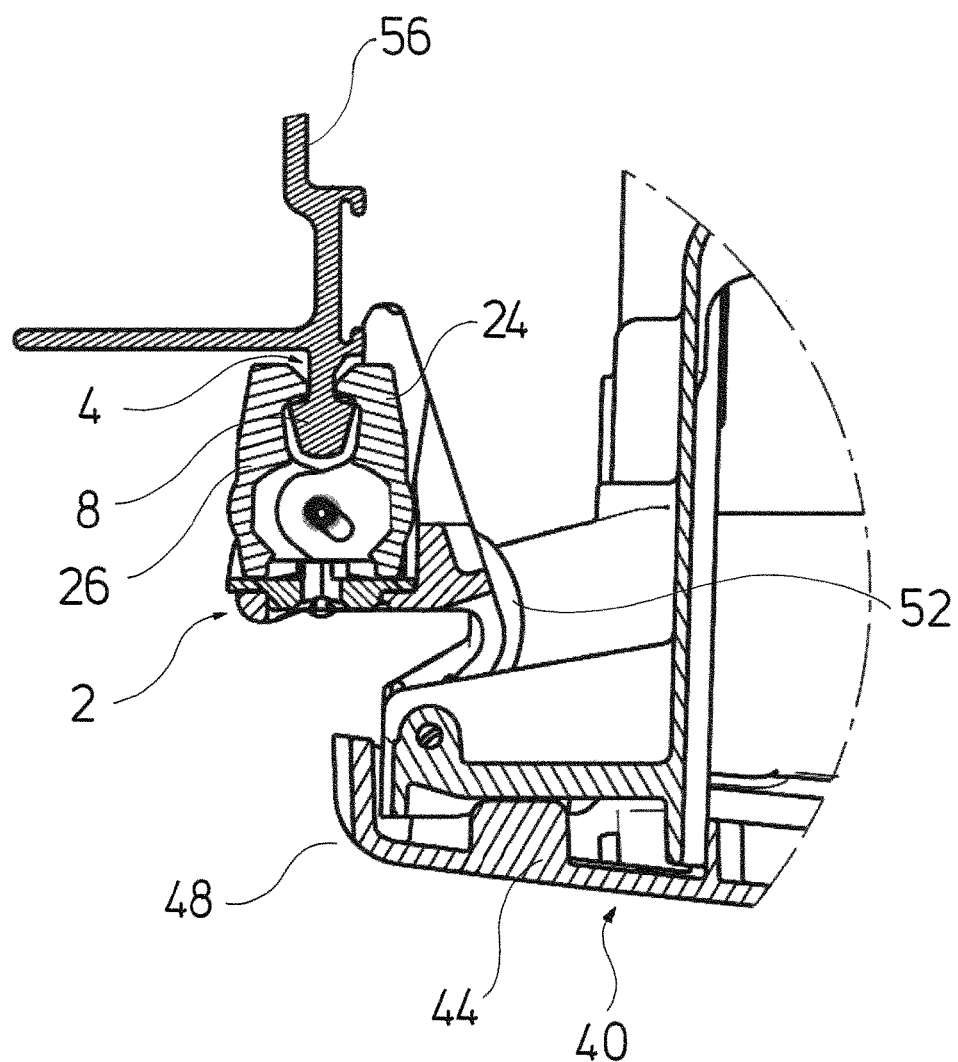

FIGS. 4, 5 and 8 show the application of the previously described fastening device 2 in combination with the fastening of a module 40 of a passenger service unit in a passenger aircraft, said module being equipped with an emergency oxygen supply device. The module 40 is arranged hanging in a supply channel 42 which is formed in a passenger cabin of the passenger aircraft above the passenger seats.

The module 40 comprises a base plate 44 which faces the passenger seats. A housing 46, in which an emergency oxygen supply device is arranged, is formed on a side of the base plate 4 which faces the supply channel 42. In each case two fastening devices 2 are connected to the module 40 via connection elements 52, in the region of the two longitudinal sides 48 and 50 of the base plate 44. The fastening devices 2 correspond to the fastening devices 2 which are described by way of FIGS. 1-3.

Two longitudinal beams 56 and 58 are arranged on a wall 54 which delimits the supply channel 42 to the top, in a manner distanced to one another transversely to the longitudinal extension of the supply channel 42. A rail 4 which corresponds to the rails 4 represented in FIGS. 1-3 is arranged in each case on the longitudinal side of the beam 56 and 58 which is away from the wall 54. The module 40, with two fastening devices 2 which are arranged in the region of the longitudinal side 48 of the base plate 44, is fastened on the rail 4 arranged on the longitudinal beam 56, and the module 40, with two fastening devices 2 arranged in the region of the longitudinal side 48 of the base plate 44, is fastened on the rail 4 arranged on the longitudinal beam 58.

Figure 6:
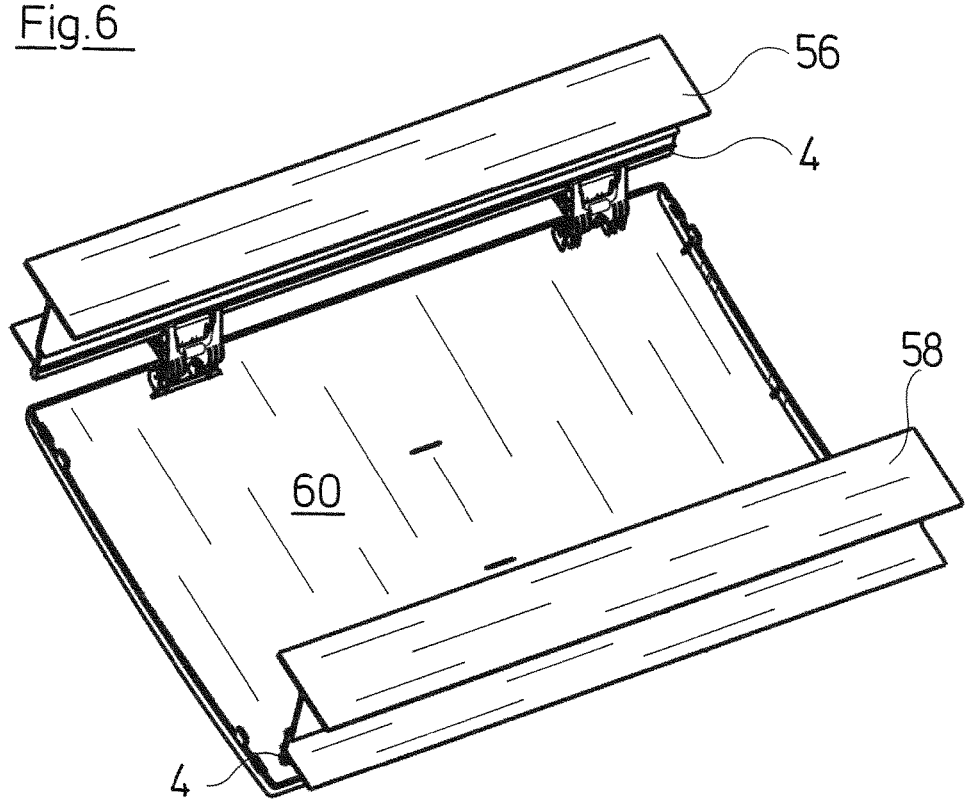
FIG. 6 in a perspective view, a fastening system with a panel which is fastened in an aircraft on rails, FIG. 7 the fastening system according to FIG. 6, in a lateral view, FIG. 8 a detail of FIG. 5, and FIG. 9 a detail of FIG. 7.
Figure 7:
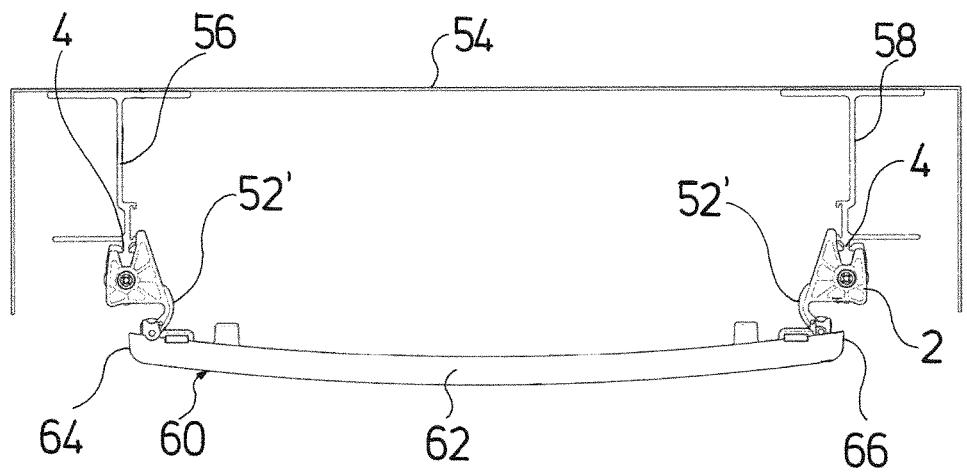
Figure 9:
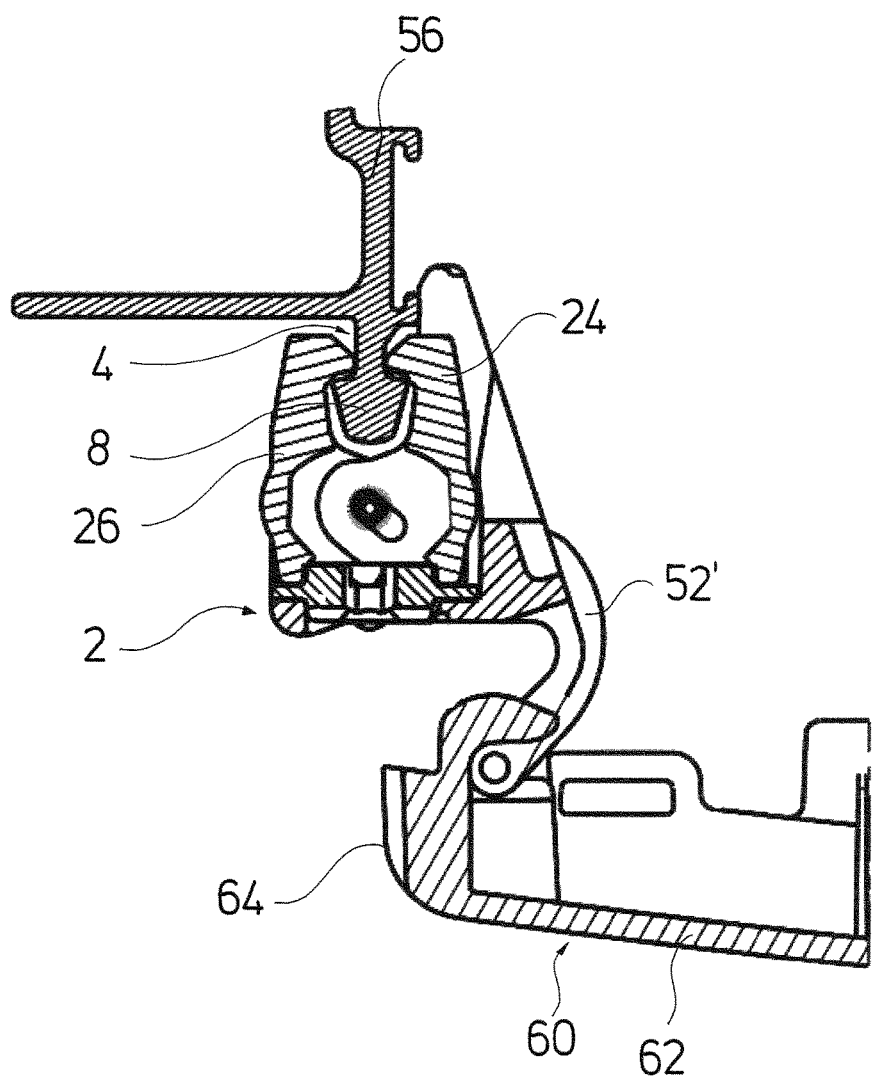

FIGS. 6, 7 and 9 show the application of the previously described fastening device 2, in combination with the fastening of a panel 60 which is likewise arranged in the supply channel 42 formed above the passenger seats. As is the case with the module 40, the panel 60 also comprises a base plate 62 which faces the passenger seats. In each case two fastening devices 2 are connected to the panel 60 via connection elements 52', in the region of the two longitudinal sides 64 and 66 of the base plate 62. In FIGS. 6, 7 and 9, the fastening devices 2 also correspond to the fastening devices 2 described by way of FIG. 1-3. The panel 60 is fastened on the rail 4 arranged on the longitudinal beam 56, by two fastening devices 2 which are arranged in the region of the longitudinal side 64 of the base plate 62, and the panel 60 is fastened on the rail 4 arranged on the longitudinal beam 58, by two fastening devices 2 arranged in the region of the longitudinal side 66 of the base plate 62.

LIST OF REFERENCE NUMERALS

2—fastening device
4—rail

6—section
8—widening
10—base body
12—section
14—section
16—section
18—receiver
20—through-hole
22—pivot
24—locking
24a—force arm
24b—force arm
26—locking hooks
26a—force arm
26b—load arm
28—projection
30—elongate hole
32—projection
34—control body
36—opening
38—shaft
40—module
42—supply channel
44—base plate
46—housing
48—longitudinal side
50—longitudinal side
52, 52'—connection element
54—wall
56—longitudinal beam
58—longitudinal beam
60—panel
62—base plate
64—longitudinal side
66—longitudinal side
X—biasing force
Y—force
Z—force

What is claimed is:

1. A fastening system in a vehicle, comprising:
at least one rail arranged on a vehicle side, the at least one rail configured to releasably fasten an object;
at least one fastening device arranged on an object side, the at least one fastening device configured to positively fix the object on the rail;
a spring configured to be provided on the fastening device, the spring including a pivot, the spring, with a positive arrangement of the fastening device on the rail, configured to produce a non-positive fit between the fastening device and the rail;
two locking hooks including a first locking hook and a second locking hook provided on the fastening device, the two locking hooks configured to articulate on the pivot, wherein a first side of the first locking hook and a second side of the second locking hook away from the first side engage around an end region of the rail which is configured to face the object; and
a control body rotatably mounted in a space between a third side of the first locking hook and a fourth side of the second locking hook, the control body having a length and a width, the length greater than the width, the control body configured to be adjusted from a first orientation in which the width is between the third side and the fourth side to a second orientation in which the length is between the third side and the fourth side to fix the object on the rail.

2. A fastening system according to claim 1, wherein the fastening device comprises at least one receiver for the rail, wherein the rail and the receiver are configured to form a non-positive connection to one another.

3. A fastening system according to claim 2, wherein the rail in an end region facing the object comprises a widening having a cross section tapering in a wedge-shaped manner in a direction of the object, wherein the at least one receiver has a cross-sectional contour corresponding to the widening.

4. A fastening system according to claim 2, wherein the at least one receiver includes two receivers which are distanced to one another, wherein at least one locking element which is connected via the spring to the object is arranged in an intermediate space between the receivers.

5. A fastening system according to claim 1, wherein the pivot includes a longitudinal extension, wherein the pivot is configured to be elastically yielding transverse to the longitudinal extension.

6. A fastening system according to claim 1, wherein the locking hooks are each configured as a two-sided lever and each comprise an elongate hole, through which the pivot is configured to be led.

7. A fastening system according to claim 6, wherein the control body is configured to spread force arms of the locking hooks.

8. A fastening system according to claim 1, wherein the object to be fastened includes a passenger service unit configured to be fastened in a passenger aircraft on two rails which are arranged above passenger seats in a supply channel.

9. A fastening device for fastening an object on a rail which is arranged in a vehicle, wherein the fastening device is configured to be connectable to the object, wherein the fastening device is configured to be positively fixed on the rail, and wherein the fastening device includes a spring, wherein the spring includes a pivot and is configured to create a non-positive fit between the fastening device and the rail given a positive arrangement of the fastening device on the rail;
the fastening device comprising:
two locking hooks including a first locking hook and a second locking hook configured to articulate on the pivot, wherein a first side of the first locking hook and a second side of the second locking hook away from the first side engage around an end region of the rail which is configured to face the object; and
a control body rotatably mounted in a space between a third side of the first locking hook and a fourth side of the second locking hook, the control body having a length and a width, the length greater than the width, the control body configured to be adjusted from a first orientation in which the width is between the third side and the fourth side to a second orientation in which the length is between the third side and the fourth side to fix the object on the rail.

10. A fastening device according to claim 9, further comprising at least one receiver for the rail arranged on a vehicle side, wherein the receiver is configured to form a non-positive connection to the rail.

11. A fastening device according to claim 9, further comprising two receivers which are distanced to one another and are for the rail arranged on a vehicle side, wherein at least one locking element is configured to be connected to the spring and is arranged in a free space between the receivers.

12. A fastening device according to claim 9, wherein the pivot includes a longitudinal extension, wherein the pivot is configured to elastically yield transverse to the longitudinal extension.

13. A fastening device according to claim 9, wherein the locking hooks are each configured as a two-sided lever and each comprise an elongate hole, through which the pivot is configured to led.

14. A fastening device according to claim 13, wherein the control body is configured to spread force arms of the locking hooks.

\* \* \* \* \*